(12) United States Patent
Chadli et al.

(10) Patent No.: US 10,708,738 B2
(45) Date of Patent: Jul. 7, 2020

(54) SYSTEM AND METHOD FOR EXECUTING AN APPLICATION ON A TERMINAL PROVIDED WITH A CHIP CARD

(71) Applicant: Orange, Paris (FR)

(72) Inventors: Youssef Chadli, Issy les Moulineaux (FR); Bruno Chatras, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/563,814

(22) PCT Filed: Mar. 25, 2016

(86) PCT No.: PCT/FR2016/050675
§ 371 (c)(1),
(2) Date: Oct. 2, 2017

(87) PCT Pub. No.: WO2016/156714
PCT Pub. Date: Oct. 6, 2016

(65) Prior Publication Data
US 2018/0084368 A1   Mar. 22, 2018

(30) Foreign Application Priority Data
Mar. 31, 2015   (FR) ...................................... 15 52761

(51) Int. Cl.
*H04W 4/60* (2018.01)
*H04L 29/08* (2006.01)
(Continued)

(52) U.S. Cl.
CPC .............. *H04W 4/60* (2018.02); *H04L 67/02* (2013.01); *H04L 69/12* (2013.01); *H04W 4/50* (2018.02); *H04W 4/70* (2018.02)

(58) Field of Classification Search
CPC .......... H04L 67/02; H04L 69/12; H04W 4/50; H04W 4/70; H04W 4/60
See application file for complete search history.

(56) References Cited

U.S. PATENT DOCUMENTS

| | | | |
|---|---|---|---|
| 8,668,135 B2 | 3/2014 | Raffard et al. | |
| 8,909,289 B2 * | 12/2014 | Kim ........................ | G06F 9/451 455/558 |

(Continued)

FOREIGN PATENT DOCUMENTS

| | | | | |
|---|---|---|---|---|
| EP | 1004992 A2 | 5/2000 | | |
| EP | 1564957 A1 * | 8/2005 | ........ | H04W 12/0027 |

(Continued)

OTHER PUBLICATIONS

International Search Report dated May 19, 2016 for corresponding International Application No. PCT/FR2016/050675, filed Mar. 25, 2016.

(Continued)

*Primary Examiner* — Mehmood B. Khan
(74) *Attorney, Agent, or Firm* — David D. Brush; Westman, Champlin & Koehler, P.A.

(57) ABSTRACT

A method for executing an application on a terminal provided with a chip card. The method includes an installation entity verifying that the chip card possesses execution resources for executing a remote server module in cooperation with a client module being executed on the terminal in order to provide the application. When the chip card is verified, the installation entity makes available the resources for executing the remote server module, sends a request for creating a virtualized resource based on the execution resources to a virtualized resource management entity of the chip card, and orders installation of the remote server module in the chip card, in order for the created virtualized resource to execute the remote server module, in cooperation with the client module.

10 Claims, 3 Drawing Sheets

(51) Int. Cl.
*H04L 29/06* (2006.01)
*H04W 4/70* (2018.01)
*H04W 4/50* (2018.01)

(56) References Cited

U.S. PATENT DOCUMENTS

| | | | | |
|---|---|---|---|---|
| 2009/0065325 | A1* | 3/2009 | Potonniee | G06K 19/07716 |
| | | | | 194/210 |
| 2011/0247047 | A1* | 10/2011 | Loureiro | H04L 63/10 |
| | | | | 726/1 |
| 2011/0297740 | A1* | 12/2011 | Raffard | H04W 8/245 |
| | | | | 235/375 |
| 2012/0158395 | A1* | 6/2012 | Hughes | H04L 63/00 |
| | | | | 703/21 |
| 2012/0159569 | A1* | 6/2012 | Kim | G06F 21/604 |
| | | | | 726/1 |
| 2013/0145482 | A1* | 6/2013 | Ricci | B60W 50/0098 |
| | | | | 726/28 |
| 2014/0342715 | A1* | 11/2014 | Gu | G06F 9/455 |
| | | | | 455/418 |
| 2015/0071437 | A1* | 3/2015 | Chastain | H04W 12/04031 |
| | | | | 380/249 |
| 2015/0095477 | A1* | 4/2015 | Jung | H04M 1/57 |
| | | | | 709/223 |
| 2015/0121487 | A1* | 4/2015 | Chastain | H04L 63/083 |
| | | | | 726/6 |
| 2015/0268982 | A1* | 9/2015 | Eisenmann | G06F 9/45558 |
| | | | | 718/1 |
| 2015/0324182 | A1* | 11/2015 | Barros | G06F 8/61 |
| | | | | 717/174 |
| 2016/0216878 | A1* | 7/2016 | Ramprasad | H04W 4/50 |

FOREIGN PATENT DOCUMENTS

| | | | | |
|---|---|---|---|---|
| WO | 2010097544 A1 | 9/2010 | | |
| WO | WO-2010097544 A1 * | 9/2010 | | H04W 8/245 |

OTHER PUBLICATIONS

Written Opinion of the International Searching Authority dated May 31, 2016 for corresponding International Application No. PCT/FR2016/050675, filed Mar. 25, 2016.

TS 102 223 V12.1.0 issued by ETSI ("European Telecommunications Standards Institute") entitled Smart cards; Card Application Toolkit (CAT), Sep. 2014.

OMA ("Open Alliance Mobile"), entitled "Smartcard Web Server Enabler Architecture, Approved Version 1.2", published on Mar. 5, 2013.

* cited by examiner

SYSTEM AND METHOD FOR EXECUTING AN APPLICATION ON A TERMINAL PROVIDED WITH A CHIP CARD

CROSS-REFERENCE TO RELATED APPLICATIONS

This Application is a Section 371 National Stage Application of International Application No. PCT/FR2016/050675, filed Mar. 25, 2016, the content of which is incorporated herein by reference in its entirety, and published as WO on Oct. 6, 2016, not in English.

FIELD OF THE DISCLOSURE

The invention lies within the field of terminals provided with a chip card, and relates more particularly to a method and system for executing an application on such a terminal. The invention may be applied particularly advantageously in the field of communication between machines requiring no human interaction, or machine-to-machine communication (M2M, for "Machine-To-Machine").

BACKGROUND OF THE DISCLOSURE

The expression "M2M terminals" denotes objects or apparatus equipped with data processing means and with data transmitting/receiving means enabling them to interact, notably, with a communications network such as a mobile network (e.g. those known as LTE, for "Long Term Evolution", or UMTS, for "Universal Mobile Telecommunications System"). There is a wide variety of M2M terminals: thermometers, tensiometers, watches, traffic lights, vehicles, etc.

We will now consider the case of an M2M terminal designed to exchange data via a mobile network. Such an M2M terminal is provided with a UICC ("Universal Integrated Circuit Card") card, as defined in document TS 102 223 V12.1.0 issued by ETSI ("European Telecommunications Standards Institute") entitled "Smart cards; Card Application Toolkit (CAT)". The main function of the UICC card is to enable the M2M terminal to be attached to the mobile network and to access certain services offered by the mobile network. A UICC card is, more particularly, a chip card. It is usually composed of a microprocessor and various types of memory. Four examples of main uses are identified for a UICC card. It is used, notably, by a terminal of a mobile network to authenticate a subscriber and thus secure the attachment of the terminal to the mobile network; to store data (such as address book entries, short messages of the type known as SMS, for "Short Message Service", etc.) at the request of the terminal; to store configuration parameters (such as the address of a P-CSCF proxy server, emergency call numbers, etc.) supplied for example by the mobile network operator; or to offer functions of a web server executed within the UICC card.

The document issued by the OMA ("Open Alliance Mobile"), entitled "Smartcard Web Server Enabler Architecture, Approved Version 1.2", published on 5 Mar. 2013, describes an integration of a web server into a UICC card. A web server is defined in this document as a server sending web pages in response to HTTP ("HyperText Transfer Protocol") requests sent by web browsers. Thus a client request is sent to a web server from a client module such as a web browser, and the result of the request is returned to the client module by the web server. The main elements of an architecture using such a server when integrated into a chip card, are as follows:

- a chip card web server or SCWS ("Smart Card Web Server"): the main purpose of this server is to enable mobile network operators to offer new services or advanced services to their subscribers. These services are based on HTTP communications between the client module installed on the terminal and the SCWS server installed on the chip card fitted to the terminal;
- an SCWS gateway: the gateway is an entity of the mobile terminal enabling provision of a connection between the client module of the terminal and the web server of the chip card, using a local transport protocol such as the BIP ("Bearer Independent Protocol") protocol. The function of the gateway is, notably, to translate the TCP/IP messages from the client module into this local transport protocol, and vice versa;
- an HTTP client module: this is the module implemented by the terminal, which originates HTTP requests sent to the SCWS server;
- an HTTPS ("HyperText Transfer Protocol Secure") client module: this is an HTTP client module that can communicate with the SCWS server, using the TLS ("Transport Layer Security") protocol;
- an SCWS administration application: this is an entity of the operator's network used for installing and updating the SCWS server.

A drawback of this method is that it necessitates the use of web technologies which are not always suitable for execution in the M2M terminal and in the chip card, as they require high computing and/or execution capacities. Furthermore, a supplier of application modules cannot develop his own services, and has to rely solely on the services offered by the SCWS server implemented by the chip card, which may be a source of major limitations in the development of an application (such as services offered by the SCWS server which do not allow the implementation of certain processes which are to be executed by the application). Additionally, the services offered by the SCWS server are services implemented with the aid of the HTTP protocol, which do not allow a supplier of application modules to have direct access to the physical resources of a chip card.

SUMMARY

According to a first aspect, the invention relates to a method for executing an application on a terminal provided with a chip card, in which an installation entity implements the following:

- a verification that the chip card has execution resources for executing a remote server module in cooperation with a client module which is being executed on the terminal to provide the application; and, the chip card having been verified as having resources for executing the remote server module:
- a request for creating a virtualized resource based on the execution resources, sent to a virtualized resources management entity of the chip card; and
- a command for installing the remote server module in the chip card, for the execution, by the created virtualized resource, of the remote server module, in cooperation with the client module.

The technical problem at the origin of the invention has arisen from the field of communication between machines requiring no human interaction. However, the proposed solution is applicable to any type of terminal provided with a chip card.

The method makes it possible to provide an execution environment for a remote server module, forming an application, within a chip card. Thus it enables use to be made of the execution resources belonging to the chip card. These execution resources are more precisely defined as the resources (storage and calculation resources, interfaces, etc.) required for the execution of a suite of instructions in a machine language associated with the chip card. These are resources enabling the execution of a set of instructions in machine language of an executable module such as the remote server module. The execution resources are, in particular, verified as being insufficient for the execution of the remote server module when the latter comprises a set of instructions in a machine language not supported by the chip card fitted to the terminal. This is also the case when the virtualized resources management entity of the chip card is not capable of allocating the resources required for the execution of the remote server module. The method makes it possible to verify that the chip card has the necessary resources for implementing the remote server module. Thus the method enables a terminal to make use of the execution resources of a chip card fitted to it. Processes are implemented by a terminal without any need to provide an increase in its processing capacities for this purpose. This results, notably, in a reduction in the manufacturing cost of such terminals, which is particularly useful in the case of M2M terminals.

The remote server module may thus be executed by any chip card provided with a processor which is compatible with the machine language instructions of the remote server module, and which has execution resources allowing the execution of the module. Similarly, the supplier of the application is not restricted to a particular programming language when programming the application implemented by the terminal.

In a particular embodiment, the terminal may also advantageously be equipped with a chip card selected according to the execution resources required by the processes to be executed by the terminal itself. Similarly, a supplier of an application may offer different remote server modules for the same application, thus adapting the proposed processes according to the type of chip card fitted to the terminal.

The execution of the remote server module by a virtualized resource managed by a virtualized resources management entity makes it possible to use execution resources of the chip card in what is known as an infrastructure as a service or IaaS ("Infrastructure as a Service") model. The execution resources of the chip card are thus available on request, and may be shared in a secure manner among a number of applications.

According to a particular characteristic of the method according to the first aspect, the method comprises, when the chip card does not have execution resources for executing the remote server module, the installation of a local server module in the terminal, to enable the terminal to execute the local server module in cooperation with the client module to provide the application.

Thus, by implementing the method it is possible to use a second executable module installed in the terminal, the local server module, according to the resources available in the terminal and in the chip card respectively. It is thus possible to preferentially select the execution of a local server module by the terminal. The local server module is, for example, executed by the chip card when the latter has more execution resources than the terminal; conversely, the remote server module is executed by the terminal when the latter has more execution resources than the chip card.

In particular, when the terminal has insufficient execution resources to execute the remote server module, the method makes it possible to ensure that the terminal will operate in an alternative mode based on the execution resources of the terminal. This alternative mode is, for example, a degraded operation of the terminal (for example, processes are executed more slowly, the number of functions is reduced, and so on).

According to a particular characteristic of the method according to the first aspect, the method comprises obtaining, from the virtualized resources management entity, information on the availability of execution resources on the chip card, the verification that the chip card has execution resources for executing the remote server module being carried out solely for the execution resources determined to be available by means of this information.

By obtaining information on the availability of execution resources on the chip card, the verification that the chip card has execution resources for executing the remote server module can thus be limited strictly to the execution resources available in the chip card. More particularly, an execution resource is considered to be available when it is not reserved for third-party processes planned in the chip card. The method makes it possible to provide allocation of execution resources specifically dedicated to the remote server module. The method thus makes it possible to ensure that the execution resources for executing the remote server module cannot be used by a third-party process during the subsequent execution of the remote server module.

In a particular embodiment, the installation of the remote server module is advantageously deferred until execution resources of the chip card are available.

According to a particular characteristic of the method according to the first aspect, the application is a radio signal command application, the client server module implementing a first function of transmitting and receiving the radio signal, and the remote server module implementing a second command function of the first function.

According to a particular characteristic of the method according to the first aspect, the method further comprises the installation, based on an installation policy, of a local server module in the terminal, to enable the terminal to execute the local server module, as an alternative to the remote server module, in cooperation with the client module to provide the application.

The installation policy corresponds to preferences relating to the installation of the local or remote server module. These preferences are, for example, indicated in a configuration file associated with the application, and make it possible to take into account characteristics of the application to be executed when the local or remote server module is installed. For example, such an installation policy makes it possible to install a local server module preferentially, rather than a remote server module. For an application generating high traffic on one or more radio interfaces, a manufacturer may thus prioritize the installation of a local server module, to avoid overburdening the interface between the terminal and the chip card.

According to a second aspect, the invention relates to a method for executing an application on a terminal provided with a chip card, in which method a virtualized resources management entity of the chip card implements, at the request of an installation entity:

creation of a virtualized resource based on execution resources of the chip card; and installation of a remote server module in the chip card, for the execution, by the created virtualized resource, of the remote server module, in cooperation with the client module, to provide the application.

According to a particular characteristic, the virtualized resources management entity implements the supply, to an installation entity of the application, of information on the availability of execution resources on the chip card for executing the remote server module.

According to a third aspect, the invention relates to a terminal, comprising means arranged to receive a chip card and an installation entity comprising:

a verification module, arranged to verify that the chip card has execution resources for executing a remote server module in cooperation with a client module which is being executed on the terminal to provide an application;

a sending module, activated when the chip card is verified as having execution resources for executing the remote server module, and arranged for sending a request for creating a virtualized resource based on the execution resources, to a virtualized resources management entity of the chip card; and a command module, activated when the chip card is verified as having execution resources for executing the remote server module, and arranged for commanding the installation of the remote server module in the chip card, to enable the remote server module to be executed by the virtualized resource created based on the execution resources, in cooperation with the client module.

According to a fourth aspect, the invention relates to a chip card, comprising means arranged to implement a virtualized resources management entity comprising:

a generation module, arranged to create at least one virtualized resource based on execution resources of the chip card; and an installation module, arranged to install a remote server module in the chip card, for the execution of the remote server module by the created virtualized resource, in cooperation with the client module.

The stated advantages for the execution method according to any of the characteristics of the first aspect may be transposed directly to the method according to any of the characteristics of the second aspect, to the terminal according to the third aspect, and to the chip card according to the fourth aspect, respectively.

According to a fifth aspect, the invention relates to a system for executing an application, comprising a terminal according to the third aspect, provided with a chip card according to the fourth aspect.

According to a sixth aspect, the invention also relates to a program for an application installation entity, comprising program code instructions intended to command the execution of the steps of the execution method described above, when said program is executed by said application installation entity, and a recording medium, readable by an application installation entity, on which a program for an application installation entity is recorded.

According to a seventh aspect, the invention also relates to a program for a virtualized resources management entity, comprising program code instructions intended to command the execution of the steps of the execution method described above, when said program is executed by said virtualized resources management entity, and a recording medium, readable by a virtualized resources management entity, on which a program for a virtualized resources management entity is recorded.

BRIEF DESCRIPTION OF THE DRAWINGS

The invention will be more readily understood with the aid of the following description of particular embodiments, with reference to the attached drawings, in which.

DETAILED DESCRIPTION OF ILLUSTRATIVE EMBODIMENTS

Figure 1:
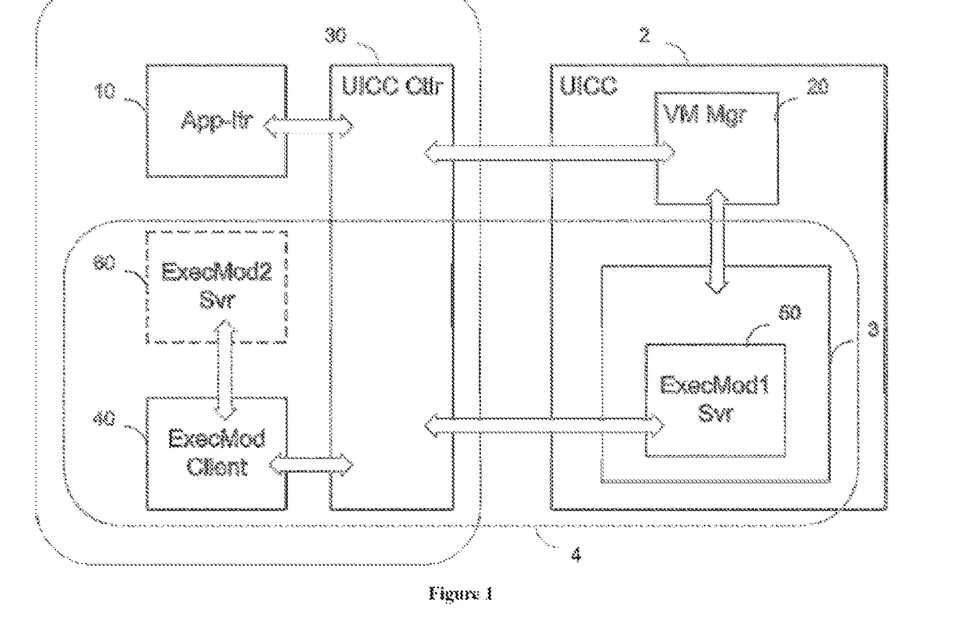
FIG. 1 shows a system for executing an application on a terminal according to a particular embodiment.

FIG. 1 shows a system for executing an application 4. The execution system comprises a terminal 1 provided with a chip card 2. More particularly, the terminal 1 comprises means arranged to receive the chip card and an installation entity 10 of the application 4. The terminal 1 further comprises a control module 30 of the chip card 2. The chip card 2 comprises means arranged to implement a virtualized resources management entity 20. The installation entity 10 and the control module 30 are located in the terminal. The virtualized resources management entity 20 is located in the chip card 2.

The installation entity 10 is a module which has been previously installed in the terminal 1 provided with the chip card 2, the function of this entity being to install the application 4 in the terminal 1 for the purpose of execution. To carry out this installation, the installation entity 10 takes into account, notably, the execution resources of the chip card 2, as well as the characteristics of the constituent modules 40, 50, 60 of the application 4. The installation entity 10 determines, in particular, an execution environment adapted for the execution of each module 40, 50, 60 forming the application 4. The expression "execution environment" is here taken to mean a set of hardware and software resources for executing a module.

The application 4 is, for example, a software module for executing one or more computer processes (speech analysis, stress level analysis, heart rate analysis, supply of meteorological information, voltage measurements, etc.). These processes are of different kinds, and are examples of functions that a terminal is capable of providing. In the described embodiment, the application 4 comprises a plurality of executable modules 40, 50, 60, each having the function of executing a subset of given processes to enable the application 4 to perform its function or functions. The executable modules 40, 50, 60 are distinguished, more particularly, by the type of functions that they implement. An executable module corresponds to an executable code. A module is therefore executable in a given execution environment, that is to say by a given device provided with a given operating system. The following terms are used below to distinguish the different types of module:

"client module": executable code implementing functions to be executed by the terminal 1;

"remote server module": executable code implementing functions to be executed by the chip card 2. Such a module interacts with a client module;

"local server module": executable code implementing functions to be executed by the terminal 1, as an alternative to functions of a remote server module (this is detailed below with reference to FIG. 2). Such a module interacts with a client module.

In the embodiment described with reference to FIG. 1, the executable module 40 is thus a client module, the executable module 50 is a remote server module, and the executable module 60 is a local server module.

The chip card 2 is inserted into a location provided for this purpose in the terminal 1. The virtualized resources management entity 20 located in the chip card is, for example, a hypervisor. A hypervisor is defined more particularly as a virtualization platform enabling a plurality of operating systems to function simultaneously on the same physical machine. The virtualized resources management entity 20 manages virtualized resources (also called "virtual machines"). More particularly, it manages the creation, modification and deletion of these resources, according to the execution resources of the chip card 2. In the example of embodiment described, the remote server module 50 is executed by a virtualized resource 3, the latter having been created by the virtualized resources management entity 20 during the implementation of the method. The virtualized resource 3 is thus based on physical resources of the chip card 2.

The control module 30 provides communication between the installation entity 10 of the application 4 and the virtualized resources management entity 20. The control module 30 also enables the client module 40 and the remote server module 50 to interact to execute the application 4. Communications between the modules are provided, for example, by a communications protocol of the TCP/IP transport layer. There are no limits on the communications protocol of the transport layer used to provide exchanges between modules. This protocol is, for example, the UDP ("User Datagram Protocol") or TCP ("Transmission Control Protocol") protocol.

The modules 40, 50, 60 forming the application 4 may also communicate with one another. This may take the form of a direct communication link. This is the case, notably, for communication between two executable modules executed by the same device (e.g. communication between the local server module 60 and the client module 40). It may also take the form of a communication channel established via the control module 30 (e.g. communication between the client module 40 and the remote server module 50).

The application 4 has been described with three modules 40, 50, 60. However, there is no limit on the number of modules forming the application 4. In particular, in another embodiment, the application may consist solely of a client module 40 and a remote server module 50.

The execution system has been described with the implementation of a hypervisor as the virtualized resources management entity. However, there is no limit on the virtualization technique that is implemented. For example, the execution system is implemented by means of a hypervisor known as a "type I" or a "type II" hypervisor, or alternatively by a virtualization technique not using a hypervisor.

Figure 2:
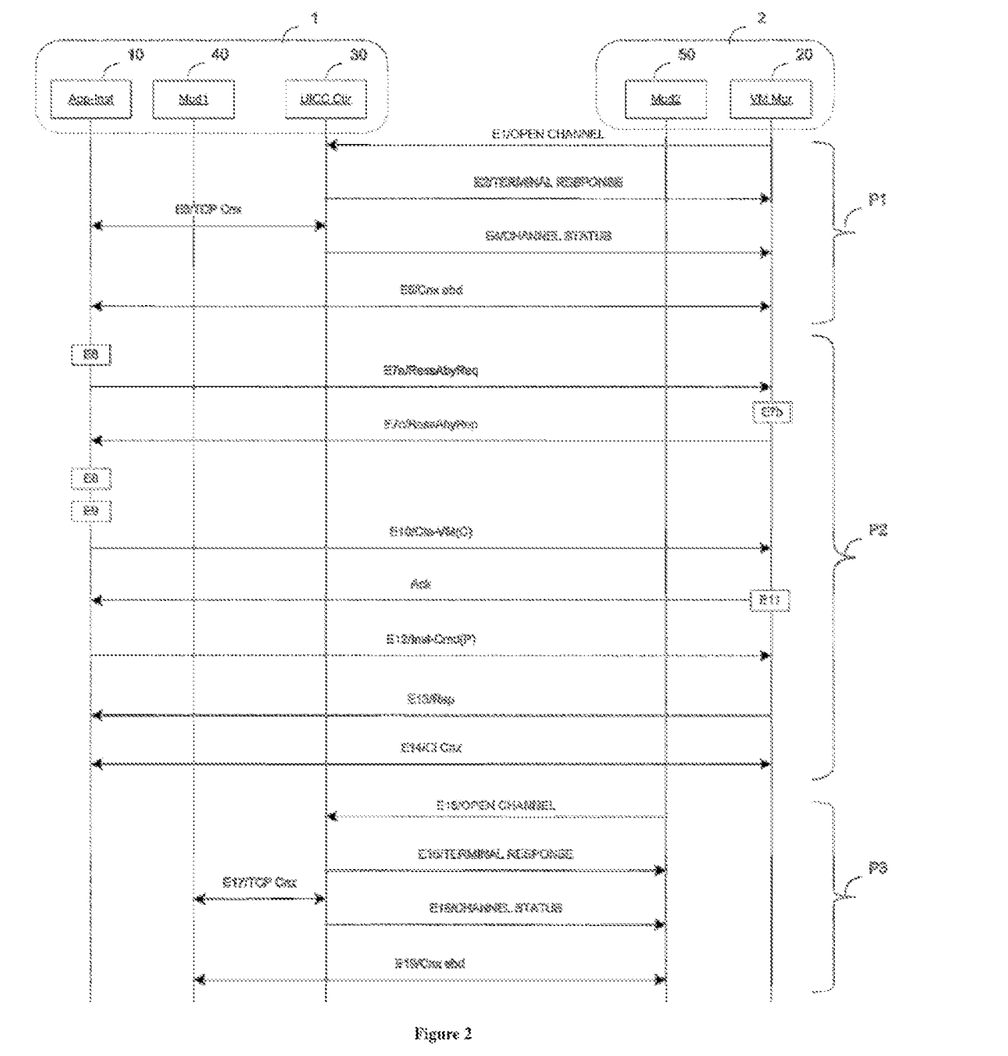
FIG. 2 shows steps of a method for executing an application on a terminal according to a particular embodiment.

FIG. 2 represents steps of a method for executing an application on a terminal 1 according to a particular embodiment. In this embodiment, it is assumed that the application is composed of three executable modules, of which two are shown in FIG. 2, namely the client module 40 and the remote server module 50. It is also assumed that the terminal 1 is a terminal having a low storage capacity of 1 MB.

The method comprises three phases, P1, P2 and P3. Phase P1 corresponds to the establishment of a connection between an installation entity 10 of an application and a virtualized resources management entity 20. Phase P2 corresponds to the installation of the application, and more precisely the installation of the client module 40 and remote server module 50, respectively, in the terminal 1 and in the chip card 2 with which the terminal 1 is provided. Phase P3 describes the execution of the application after installation, including, in particular, the establishment of a communication channel between the client module 40 and the remote server module 50. In the first two phases P1 and P2 only the installation entity 10 and the control module 30 of the chip card 2 are involved in the terminal. The client module 40 and the remote server module 50 are executed in the third phase P3.

The first phase P1 in which a connection is established between the installation entity 10 and the virtualized resources management entity 20 will now be described. This phase P1 comprises steps E1 to E5. The establishment of the connection between the installation entity 10 and the virtualized resources management entity 20 takes place, more particularly, according to the procedure described in the ETSI TS 102 223 and 3GPP ("3rd Generation Partnership Project") TS 31.111 specification documents.

In a step E1, the virtualized resources management entity 20 sends a communication channel opening command to the control module 30. The command is, for example, triggered after the chip card 2 has been inserted into the terminal 1, when the terminal 1 is switched on. The command is, for example, a USAT ("USIM Application Toolkit") "OPEN CHANNEL" command in what is called the "UICC Server Mode" as specified in paragraph 6.4.27.5 of the TS 102.223 document, version 12. It comprises a TCP port number as a parameter, indicating the port number on which the terminal 1 is asked to set itself to listen. The port number supplied by the virtualized resources management entity 20 is, for example, predefined at the level of the chip card. In another embodiment, the port number is a standardized port number.

In a step E2, the control module 30 of the terminal 1 sends a USAT response "TERMINAL RESPONSE", informing the virtualized resources management entity 20 that the control module 30 is listening on the TCP port supplied to it previously in step E1.

In a step E3, the installation entity 10 and the control module 30 establish a TCP connection, using the port number supplied by the virtualized resources management entity 20.

In a step E4, the control module 30 sends a USAT message "CHANNEL STATUS", informing the virtualized resources management entity 20 that a TCP connection is established between the installation entity 10 and the control module 30.

Then, in a step E5, a communication channel is established between the installation entity 10 and the virtualized resources management entity 20. The data exchanges between these two entities are carried out via the USAT commands "SEND DATA" and "RECEIVE DATA" for exchanges between the control module 30 and the virtualized resources management entity 20. These commands are then transcribed on the TCP connection established between the control module 30 and the installation entity 10. The "SEND DATA" and "RECEIVE DATA" commands are used according to the ETSI TS 102 223 specification document.

Step E5 concludes phase P1 of the execution method. The installation entity 10 is then able to communicate with the virtualized resources management entity 20.

Phase P2, in which the application is installed, will now be described. Phase P2 comprises steps E6 to E14.

In a step E6, the installation entity 10 verifies the type of executable submodules forming the application, using a configuration file associated with the application, and determines an installation policy associated with the application. The configuration file has the following format, for example:

| Module identifier | Type | Alternative module identifier | Execution resources needed |
|---|---|---|---|
| Mod1 | client module | | StorMem: 50 KB |
| Mod2 | remote server module | Mod3 | StorMem: 20 MB |
| Mod3 | local server module | | StorMem: 500 KB |

This file indicates, in the example of embodiment described here, that the application is formed by three executable modules. It also indicates that the module Mod1 40 is of the "client module" type, that the module Mod2 50 is of the "remote server module" type, and that the module Mod3 is of the "local server module" type. It also indicates that the module Mod3 may be installed as an alternative to the remote server module Mod2 50. The installation entity 10 thus uses this file to determine an installation policy associated with the application. The installation entity 10 determines, notably, that the client module Mod1 40 is to be installed on the terminal 1, that the remote server module Mod2 50 is preferably to be installed on the chip card 2, and that the module Mod3 may be installed as an alternative on the terminal 1. The configuration file also indicates the execution resources needed to execute a module. It indicates, notably, that the client module Mod1 40 requires 50 KB of storage memory, the remote server module Mod2 50 requires 20 MB of storage memory, and the module Mod3 requires 500 KB of storage memory.

In a step E1a, the installation entity 10 sends to the virtualized resources management entity 20 a request for information on the availability of execution resources on the chip card 2.

In a step E7b, the virtualized resources management entity 20 determines the execution resources of the chip card 2 available at the instant when step E7b is executed. In another embodiment, it may be the availability of execution resources in a future time interval that is determined.

In a step E7c, the virtualized resources management entity 20 transmits, in response to the installation entity 10, a list of execution resources of the chip card 2 determined as being available. This message comprises, for example, a storage capacity of the chip card 2, a machine language associated with the chip card 2, or a number of operations per second that the chip card can handle. By way of example, the response message indicates that the chip card 2 has a storage capacity of 100 MB.

In a step E8, the installation entity 10 installs the client module Mod1 40 in the terminal 1. Since the client module Mod1 40 is of the "client module" type, it is designed to be executed by the terminal for which it is intended, and no verification is required on its installation concerning the execution resources needed for its execution.

In a step E9, the installation entity 10 verifies that the module of the "remote server module" type can be executed by the chip card 2. In the example described, this verification concerns only the remote server module Mod2 50. More precisely, it is a matter of verifying that the chip card 2 has execution resources for executing the remote server module Mod2 50. For this purpose, the installation entity 10 compares the list of available resources obtained in step E7c with the execution resources needed to execute the remote server module Mod2 50, obtained from the configuration file associated with the application. In the example described, the remote server module Mod2 50 requires 20 MB for its execution, and the chip card 2 has a storage capacity of 100 MB. Since the storage capacity of the chip card 2 is greater than the execution resources needed to execute the remote server module Mod2 50, the installation entity determines that the remote server module Mod2 50 can be executed by the chip card 2.

In a step E10, the installation entity 10 sends to the virtualized resources management entity 20 a request for the creation of a virtualized resource, with the execution resources C of the chip card 2 that are determined to be available. The execution resources C specify the characteristics of the virtualized resource to be created (e.g. storage capacity, random access memory, computing capacity). These characteristics correspond to the execution resources needed to execute the remote server module Mod2 50, specified in the configuration file associated with the application.

In a step E11, the virtualized resources management entity 20 creates a virtualized resource with the execution resources C, then returns an acknowledgement message to the installation entity 10, informing the latter that the virtualized resource has been created. In the example described, the virtualized resource reserves, in particular, 20 MB of storage space out of the 100 MB of storage space available in the chip card 2.

In a step E12, the installation entity 10 then commands the installation of the remote server module Mod2 50 in the chip card 2, to enable the remote server module Mod2 50 to be executed by the virtualized resource created in step E11, in cooperation with the client module Mod1 40. This command comprises, more particularly, the remote server module Mod2 50 itself, and a parameter P. The parameter P can be used to indicate to the virtualized resources management entity 20 one or more initialization parameters to be transmitted to the virtualized resource when this resource has been created. By way of example, this parameter may be a port number enabling the virtualized resource to communicate with the client module Mod1 40 installed in the terminal in step E8. At the end of this step, the remote server module Mod2 50 is installed in the chip card 2, and has the port number enabling it to communicate with the client module Mod1 40 installed on the terminal 1.

In a step E13, the virtualized resources management entity 20 returns a message to the installation entity 10, informing the latter that a virtualized resource has been created to execute the remote server module Mod2 50. The message comprises an identifier of the created virtualized resource.

In a step 14, the installation entity 10 closes the communication channel established with the virtualized resources management entity 20. This last step concludes phase P2 in which the application is installed.

The final phase P3 of the execution method is concerned with establishing a communication channel between the client module Mod1 40 executed by the terminal 1 and the remote server module Mod2 50 executed on the chip card 2. Phase P3 comprises the steps E15 to E19.

In a step E15, the remote server module Mod2 50 sends a communication channel opening command to the control module 30. The command is, for example, a USAT (USIM Application Toolkit) "OPEN CHANNEL" command in what is called the "UICC Server Mode", as defined above. It comprises a TCP port number as a parameter, indicating the port number on which the terminal 1 is asked to set itself to listen. The port number supplied by the remote server module Mod2 50 is, for example, predefined at the level of the chip card. In another embodiment, the port number is a standardized port number.

In a step E16, the terminal 1 sends a USAT response "TERMINAL RESPONSE", informing the remote server module Mod2 50 that the terminal 1 is listening on the TCP port supplied to it in step E15.

In a step E17, the client module Mod1 40 and the control module 30 establish a TCP connection, using the port number supplied by the remote server module Mod2 50.

In a step E18, the control module 30 sends a USAT message "CHANNEL STATUS", informing the remote server module Mod2 50 that a TCP connection is established between the client module Mod1 40 and the control module 30.

Then, in a step E19, a communication channel is established between the client module Mod1 40 and the remote server module Mod2 50. The data exchanges between these two modules are carried out via the USAT commands "SEND DATA" and "RECEIVE DATA" for exchanges between the control module 30 and the remote server module Mod2 50. These commands are then transcribed on the TCP connection established between the control module 30 and the client module Mod1 40.

Step E19 concludes phase P3 of the execution method. The client module Mod1 40 is then able to communicate with the remote server module Mod2 50 for executing the application.

The execution method further comprises a step not shown in FIG. 2, if, in step E10, the installation entity 10 determines that the chip card 2 has insufficient execution resources to execute the remote server module Mod2 50. In this case, the installation entity 10 installs the local server module Mod3 in the terminal, so that it is executed by the terminal as an alternative to the remote server module Mod2 50, and so that it interacts with the client module 40 to execute the application.

In another embodiment, the installation of the local server module Mod3 in the terminal is decided on the basis of a parameterization of the terminal configured by a user or by a manufacturer of the terminal. This installation may also be the result of an installation preference indicated in the configuration file. The user or manufacturer of the terminal may then choose a desired type of installation, based for example on characteristics of the application and the estimated speed of execution of the remote server module Mod2 50 by the chip card 2, and of the local server module Mod3 50 by the terminal, respectively.

In another embodiment, the command for installing the remote server module Mod2 50 in the chip card 2 is included in the request for creation of a virtualized resource. A single send operation is then implemented to carry out steps E10 and E12.

In a particular embodiment, the execution method is, for example, applied to the RF ("Radio Frequency") and BBU ("Base Band Unit") functions of a mobile terminal. The RF function provides transmission and reception of a radio signal. This function for a terminal corresponds more particularly to the radio antenna of the terminal and allows connection to a mobile network. The BBU function, for its part, provides control of the RF function and the management of the procedures for connection to the mobile network.

Because of the method it is, notably, possible for the BBU function to be executed by the chip card of a terminal. For this purpose it is simply necessary to implement a remote server module acting as the BBU function executed by the chip card, and a client module acting as the RF function executed by the terminal.

In addition to the aforementioned advantages, which enable the use of the terminal resources to be reduced while offering the possibility of making use of the execution resources of the chip card fitted to the terminal, this embodiment has numerous other advantages, including but not limited to:
 a reduction of the manufacturing cost of the terminals;
 new functionalities for blocking the use of the terminal; since the BBU function is implemented by the chip card, it may be disabled, for example, by a mobile network operator;
 compatibility of the terminals with different mobile network technologies is made possible without the need for any special components in the terminal to provide this compatibility.

Figure 3:
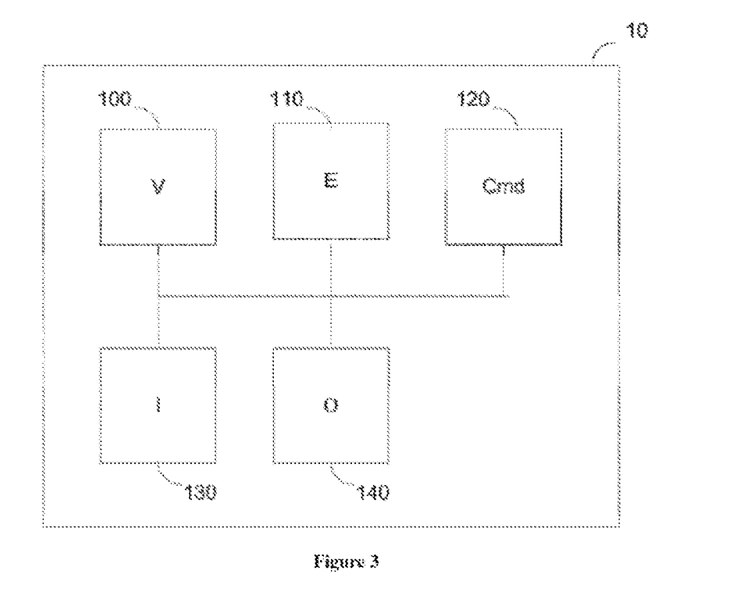
FIG. 3 shows an application installation entity according to a particular embodiment.

FIG. 3 shows an installation entity 10 for installing an application in a terminal, comprising a remote server module interacting with a client module which is being executed on said terminal. The installation entity 10 comprises:
 a verification module 100, arranged to verify that the chip card has execution resources for executing the remote server module in cooperation with the client module which is being executed on the terminal to provide an application;
 a sending module 110, activated when the chip card is verified as having execution resources for executing the remote server module, and arranged for sending a request for creating a virtualized resource based on the execution resources, to a virtualized resources management entity of the chip card; and
 a command module 120, activated when the chip card is verified as having execution resources for executing the remote server module, and arranged for commanding the installation of the remote server module in the chip card, to enable this remote server module to be executed by the virtualized resource created based on the execution resources of the chip card, in cooperation with the client module.

In a particular embodiment, the installation entity 10 comprises an installation module 130, arranged so as to install a local server module in the terminal when the chip card does not have execution resources for executing the remote server module, to enable the terminal to execute this local server module in cooperation with the client module.

In another particular embodiment, the installation entity 10 comprises an obtaining module 140, arranged to obtain, from a virtualized resources management entity, information on the availability of execution resources on the chip card, the verification module 100 then being arranged to verify that the chip card has execution resources for executing the remote server module, solely for the execution resources determined to be available by means of this information.

Figure 4:
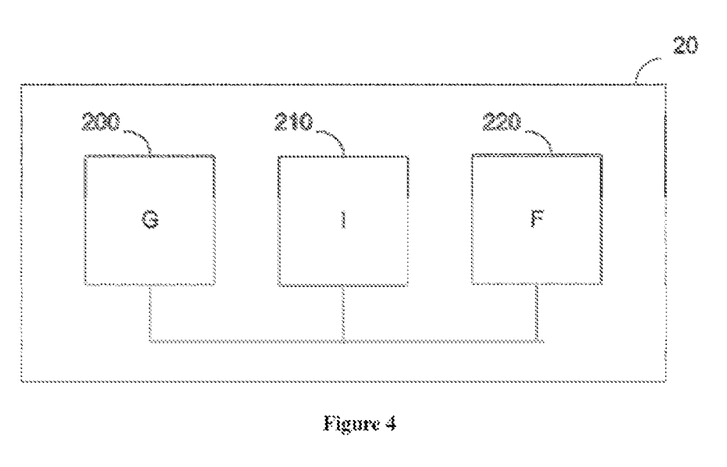
FIG. 4 shows a virtualized resources management entity of a chip card according to a particular embodiment.

FIG. 4 represents a virtualized resources management entity 20 implemented by a chip card fitted to a terminal, for executing at least one application comprising a remote server module interacting with a client module which is being executed on the terminal. The virtualized resources management entity comprises:

a generation module 200, arranged to create at least one virtualized resource based on execution resources of the chip card; and an installation module 210, arranged to install the remote server module in the chip card, for the execution of the remote server module by the created virtualized resource, in cooperation with the client module.

In another particular embodiment, the virtualized resources management entity 20 comprises a supply module 220, arranged to supply, to an installation entity of the application executed on the terminal, information on the availability of execution resources on the chip card, for executing the remote server module on the chip card in cooperation with the client module.

The invention is implemented by means of software and/or hardware components. In this context, the term "module" may equally well refer, in this document, to a software component, a hardware component, or a set of hardware and/or software components, adapted to perform a function or a set of functions as described above for the module in question.

A software component corresponds to one or more computer programs, one or more sub-programs of a program, or more generally any element of a program or a software package. Such a software component is stored in memory and is then loaded and executed by a data processor of a physical entity, and can access the hardware resources of this physical entity (memory devices, recording media, communications buses, input/output circuit cards, user interfaces, etc.).

Similarly, a hardware component corresponds to any element of a hardware assembly. It may be a hardware component, whether programmable or non-programmable, with or without an integrated processor for executing software. For example, it may be an integrated circuit, a chip card, a circuit card for executing microsoftware (firmware), etc.

In a particular embodiment, the modules 100, 110, 120, 130 and 140 are arranged to implement the execution method described above. They are preferably software modules comprising software instructions for the execution of the steps of the execution method described above, implemented by an installation entity of an application.

The invention therefore also concerns:
a program for an installation entity, comprising program code instructions intended to command the execution of the steps of the execution method described above, when said program is executed by said installation entity;
a recording medium, readable by an installation entity on which the program for an installation entity is recorded.

Similarly, the modules 200, 210 and 220 are arranged to implement the execution method described above. They are preferably software modules comprising software instructions for the execution of the steps of the execution method described above, implemented by a virtualized resources management entity. The invention therefore also concerns:
a program for a virtualized resources management entity, comprising program code instructions intended to command the execution of the steps of the execution method described above, when said program is executed by said virtualized resources management entity;
a recording medium, readable by a virtualized resources management entity on which the program for a virtualized resources management entity is recorded.

The software modules may be stored in, or transmitted by, a data medium. This medium may be a hardware storage medium, for example a CD-ROM, a magnetic disk or a hard disk, or a transmission medium such as an electrical, optical or radio signal, or a telecommunications network.

An exemplary embodiment of the present disclosure overcomes some deficiencies and/or drawbacks of the prior art and/or to make improvements thereto.

The invention claimed is:

1. A method for executing an application on a terminal provided with a chip card, in which an installation entity installed on the terminal implements the following acts:
   verifying that said chip card has execution resources for execution of a suite of instructions, in a machine language associated with the chip card, of a remote server module in cooperation with a client module which is being executed on said terminal to provide said application;
   and, when said chip card has been verified as having said resources for executing said remote server module:
      sending a request for creating a virtualized resource based on said execution resources, to an Hypervisor, acting as a virtualized resources management entity located in the chip card; and
      commanding installation of said remote server module in the chip card, for the execution, by the created virtualized resource, of said remote server module, in cooperation with the client module.

2. The method as claimed in claim 1, comprising, when the chip card does not have execution resources for executing the remote server module, installation of a local server module in the terminal, to enable the terminal to execute said local server module in cooperation with said client module to provide said application.

3. The method as claimed in claim 1, further comprising obtaining, from the virtualized resources management entity, information on the availability of execution resources on the chip card, the verification that said chip card has execution resources for executing said remote server module being carried out solely for the execution resources determined to be available by means of said information.

4. The method as claimed in claim 1, wherein said application is a radio signal command application, said client server module implementing a first function of transmitting and receiving said radio signal, and said remote server module implementing a second command function of said first function.

5. A method for executing an application on a terminal provided with a chip card, wherein in said method, an Hypervisor, acting as a virtualized resources management entity located in said chip card implements, at the request of an installation entity, the following acts:
   creating a virtualized resource based on execution resources of said chip card for execution of a suite of instructions, in a machine language associated with the chip card, of a remote server module in cooperation with a client module which is being executed on said terminal to provide said application; and
   installing the remote server module in the chip card, for the execution, by the created virtualized resource, of said remote server module, in cooperation with the client module, to provide said application.

6. The method as claimed in claim 5, further comprising supplying, to an installation entity of the application, information on availability of execution resources on the chip card for executing said remote server module.

7. A terminal, arranged to receive a chip card and comprising:
- a processor; and
- a computer-readable medium comprising instructions stored thereon, which when executed by the processor perform the following acts by an installation entity installed on the terminal:
- verifying that said chip card has execution resources for execution of a suite of instructions, in a machine language associated with the chip card, of a remote server module in cooperation with a client module which is being executed on said terminal to provide an application;
- when said chip card is verified as having execution resources for executing said remote server module, sending a request for creating a virtualized resource based on said execution resources, to an Hypervisor, acting as a virtualized resources management entity located in the chip card; and
- when said chip card is verified as having execution resources for executing said remote server module, commanding installation of said remote server module in the chip card, to enable said remote server module to be executed by the virtualized resource created based on said execution resources, in cooperation with the client module.

8. A chip card, arranged to implement an Hypervisor, acting as a virtualized resources management entity in said chip card and comprising:
- a processor; and
- a computer-readable medium comprising instructions stored thereon, which when executed by the processor perform the following acts:
- creating at least one virtualized resource based on execution resources of said chip card for execution of a suite of instructions, in a machine language associated with the chip card, of a remote server module in cooperation with a client module; and
- installing the remote server module in the chip card, for execution of said remote server module by the created virtualized resource, in cooperation with the client module.

9. A non-transitory computer-readable recording medium comprising a program for an application installation entity, comprising program code instructions to command execution of an application on a terminal provided with a chip card, when the instructions are executed by a processor, wherein the instructions configure the terminal to perform acts comprising:
- verifying that said chip card has execution resources for execution of a suite of instructions of a remote server module in cooperation with a client module which is being executed on said terminal to provide said application;
- and, when said chip card has been verified as having said resources for executing said remote server module:
- sending a request for creating a virtualized resource based on said execution resources, to an Hypervisor, acting as a virtualized resources management entity located in the chip card; and
- commanding installation of said remote server module in the chip card, for the execution, by the created virtualized resource, of said remote server module, in cooperation with the client module.

10. A non-transitory computer-readable recording medium comprising a program for executing an application on a terminal provided with a chip card, when the instructions are executed by a processor, wherein the instructions configure an Hypervisor, acting as a virtualized resources management entity located in said chip card of the terminal to perform acts comprising:
- creating a virtualized resource based on execution resources of said chip card for execution of a suite of instructions in a machine language associated with the chip card of a remote server module in cooperation with a client module which is being executed on said terminal to provide said application; and
- installing the remote server module in the chip card, for the execution, by the created virtualized resource, of said remote server module, in cooperation with the client module, to provide said application.

\* \* \* \* \*